(12) United States Patent
Kalitsov et al.

(10) Patent No.: US 11,087,791 B1
(45) Date of Patent: Aug. 10, 2021

(54) DATA STORAGE DEVICE WITH VOLTAGE-ASSISTED MAGNETIC RECORDING (VAMR) FOR HIGH DENSITY MAGNETIC RECORDING

(71) Applicant: Western Digital Technologies, Inc., San Jose, CA (US)

(72) Inventors: Alan Kalitsov, Morgan Hill, CA (US); Kumar Srinivasan, Redwood City, CA (US); Bhagwati Prasad, Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/867,373

(22) Filed: May 5, 2020

(51) Int. Cl.
| | | |
|---|---|---|
| *G11B 5/012* | (2006.01) | |
| *G11B 5/66* | (2006.01) | |
| *G11B 19/20* | (2006.01) | |
| *G11B 20/12* | (2006.01) | |
| *G11B 5/73* | (2006.01) | |
| *G11B 5/00* | (2006.01) | |

(52) U.S. Cl.
CPC ............ *G11B 5/66* (2013.01); *G11B 5/73919* (2019.05); *G11B 19/20* (2013.01); *G11B 20/1258* (2013.01); *G11B 2005/001* (2013.01); *G11B 2005/0021* (2013.01); *G11B 2005/0024* (2013.01); *G11B 2005/0034* (2013.01)

(58) Field of Classification Search
None
See application file for complete search history.

(56) References Cited

U.S. PATENT DOCUMENTS

| | | | |
|---|---|---|---|
| 5,410,504 A | * | 4/1995 | Ward .................... G11B 11/05 365/149 |
| 7,706,103 B2 | | 4/2010 | Seigler |
| 8,023,218 B2 | | 9/2011 | Zhou et al. |
| 8,129,043 B2 | | 3/2012 | Hauet et al. |
| 9,240,799 B1 | | 1/2016 | Wang et al. |
| 9,779,865 B2 | | 10/2017 | Wang et al. |

(Continued)

OTHER PUBLICATIONS

Ko, Jungho et al.; "Voltage-Assisted Magnetic Switching in MgO/CoFeB-Based Magnetic Tunnel Junctions by way of Interface Reconstruction"; Applied Materials & Interfaces; American Chemical Society, vol. 9, pp. 42296-42301, Nov. 20, 2017.
Zhang, Jia et al,; "Elucidating the Voltage Controlled Magnetic Anisotropy"; Arxiv Papers, https://arxiv.org/ftp/arxiv/papers/1612/1612.02724.pdf; Dec. 2016 (8 pages).

(Continued)

*Primary Examiner* — Peter Vincent Agustin
(74) *Attorney, Agent, or Firm* — Patterson & Sheridan, LLP; Steven H. Versteeg

(57) ABSTRACT

A data storage drive includes a magnetic recording media comprising a ferroelectric layer between a bottom electrode layer and a top electrode layer. An applied voltage to the ferroelectric layer generates a strain that is transferred to a ferromagnetic recording layer formed proximate to the ferroelectric layer. The change in strain transferred to the recording layer changes the magnetic properties of the recording layer. A voltage can be selectively applied to all or part of the ferroelectric layer to place the ferromagnetic recording layer in a low coercivity state to assist in writing data. Voltage-assisted magnetic recording (VAMR) is provided based upon control of a magnetic recording media comprising a ferroelectric layer between a bottom electrode layer and a top electrode layer.

24 Claims, 5 Drawing Sheets

(56) References Cited

U.S. PATENT DOCUMENTS

| | | | |
|---|---|---|---|
| 2002/0085317 A1* | 7/2002 | Hoshino | B82Y 25/00 360/320 |
| 2005/0128616 A1 | 6/2005 | Johns et al. | |
| 2008/0024910 A1 | 1/2008 | Seigler | |
| 2008/0180849 A1* | 7/2008 | Umemiya | G11B 5/4873 360/240 |
| 2008/0220247 A1* | 9/2008 | Hong | G11B 9/02 428/332 |
| 2009/0128965 A1* | 5/2009 | Mizuno | G01R 33/093 360/324 |
| 2010/0002563 A1 | 1/2010 | Kim et al. | |
| 2010/0015729 A1* | 1/2010 | Choi | H01L 21/3105 438/3 |
| 2010/0159283 A1* | 6/2010 | Ibusuki | G11B 5/667 428/829 |
| 2010/0195369 A1* | 8/2010 | Zhao | G11C 11/22 365/145 |
| 2012/0294137 A1 | 11/2012 | Hong et al. | |
| 2013/0040167 A1* | 2/2013 | Alagarsamy | G11B 5/851 428/831.2 |
| 2014/0177327 A1 | 6/2014 | Khalili Amiri et al. | |
| 2014/0210026 A1* | 7/2014 | Karlsson | G11C 11/161 257/422 |
| 2014/0247653 A1 | 9/2014 | Wang et al. | |
| 2015/0109699 A1 | 4/2015 | Boone et al. | |

OTHER PUBLICATIONS

Aksomniem, Suttipan et al,; "Trapping Electron-Assisted Magnetic Recording Enhancement via Dielectric Underlayer Media"; IEEE Transactions on Magnetics, vol. 50, No. 10, Oct. 2014 (6 pages).

Kato, Yushi et al.; "Giant Voltage-Controlled Magnetic Anisotropy Effect in a Crystallographically Strained CoFe System" Applied Physics Express 11 053007; https://doi.org/10.7567/apex.11.053007; 2018 (6 pages).

F. Zighem et al.; "Voltage-induced Strain Control of the Magnetic Anisotrophy in a Ni Thin Film on Flexible Substrate" Journal of Applied Phyics, vol. 114, 073902, 2013 (7 pages).

Wang, Xinjun et al,; "E-Field Control of the RKKY Interaction in FeCoB/Ru/FeCoB/PMN-PT", Multiferroic Heterostructures, Advanced Materials, https://onlinelibrary.wiley.com/doi/abs/10.1002/adma.201803612, 2018, (8 pages).

Lu, Zhihong et al.; "First-Principles Study Magnetic Properties of L10-ordered MnPt and FePt Alloys", The American Physical Review B 81; pp. 094437-8-094437-1, 2010.

Song, Cheng et al.; "Recent Progress in Voltage Control of Magnetism: Materials, Mechanisms, and Performance"; Progrerss in Material Science, 87; https://www.sciencedirect.com/science/article/abs/pii/S0079642517300166; pp. 33-82, 2017.

International Search Report and the Written Opinion for International Application No. PCT/US2020/065161 dated Mar. 24, 2021, 12 pages.

\* cited by examiner

DATA STORAGE DEVICE WITH VOLTAGE-ASSISTED MAGNETIC RECORDING (VAMR) FOR HIGH DENSITY MAGNETIC RECORDING

BACKGROUND OF THE DISCLOSURE

Field of the Disclosure

Embodiments of the present disclosure generally relate to a data storage device, such as a hard disk drive, using a magnetic recording media comprising a ferroelectric layer between a bottom electrode layer and a top electrode layer.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording media to increase the function and the capability of a computer.

In order to achieve higher recording densities, such as recording densities exceeding 2 Tbit/in$^2$ for a magnetic recording media, the width and pitch of write tracks of perpendicular magnetic recording (PMR) magnetic media are narrowed, and thus the corresponding magnetically recorded bits encoded in each write track are narrowed. It has been proposed to use PMR magnetic media employing a recording layer of a granular film with high magnetic anisotropy (e.g., high $K_u$ materials) to achieve thermal stability (e.g., to avoid superparamagnetism).

Heat assisted magnetic recording (HAMR) and microwave assisted magnetic recording (MAMR) are two types of energy-assisted magnetic recording (EAMR) write heads that may be able to write to a granular film PMR recording layer. In HAMR, a laser source is located next to or near the write element in order to produce heat, such as a laser source exciting a near-field transducer (NFT) to produce heat at a write location of a magnetic recording media. The heat at the write location reduces an effective coercivity of the magnetic recording media. In MAMR, a spin torque oscillator (STO) device is located next to or near the write element in order to produce an assisting field, such as in a microwave frequency band. The assisting field reduces an effective coercivity of a magnetic recording media. However, EAMR write heads have not yet be widely released in production due to low repeatability and/or low reliability of the EAMR write heads.

Therefore, there is a need for an improved PMR magnetic recording media and data storage drives to achieve higher recording densities.

SUMMARY OF THE DISCLOSURE

Embodiments of the present disclosure generally relate to a data storage device, such as a hard disk drive, using a magnetic recording media comprising a ferroelectric layer between a bottom electrode layer and a top electrode layer.

In one embodiment, a magnetic media drive includes a write head, a magnetic disk, and a control unit. The magnetic disk includes a magnetic recording media. The magnetic recording media includes a bottom electrode layer, a top electrode layer, a ferroelectric layer between the bottom electrode layer and the top electrode layer, and a recording layer over the top electrode layer. The control unit is configured to cause a voltage to be applied to at least a part of the magnetic recording media via the top electrode layer and bottom electrode layer when the write head is writing to the magnetic recording media.

In one embodiment, a method of magnetic recording includes applying a voltage to a magnetic recording media and writing to the magnetic recording media with a recording head. The magnetic recording media includes a bottom electrode layer, a top electrode layer, and a ferroelectric layer between the bottom electrode layer and the top electrode layer, and a recording layer over the top electrode layer. The voltage is applied via the top electrode layer and the bottom electrode layer.

In one embodiment, a magnetic recording media is formed over a substrate or platter. The magnetic recording media includes a bottom electrode layer and a top electrode layer. A ferroelectric layer is between the bottom electrode layer and the top electrode layer. A recording layer is over or on the top electrode layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s). Usage in the Summary of the Disclosure or in the Detailed Description of the term "comprising" shall mean comprising, consisting essentially, and/or consisting of. Usage of the terms "bottom", "top", "upper", "lower", "over", "under", and other similar terms are used for ease of description and denote relative spatial orientation—not a fixed orientation to gravity.

Certain embodiments are directed to a data storage drive, such as a hard disk drive, including a magnetic recording media comprising a ferroelectric layer between a bottom electrode layer and a top electrode layer. An applied voltage to the ferroelectric layer deforms the lattice and/or the shape of the ferroelectric layer generating a strain that is transferred to a ferromagnetic recording layer formed proximate to the ferroelectric layer. The change in strain transferred to the recording layer changes the magnetic properties of the recording layer. A voltage can be selectively applied to all or part of the ferroelectric layer to place the ferromagnetic recording layer in a low coercivity state to assist in writing data and in a high coercivity state to assist in thermal stability of the stored data. Voltage-assisted magnetic recording (VAMR) is provided based upon control of a magnetic recording media comprising a ferroelectric layer between a bottom electrode layer and a top electrode layer.

Figure 1:
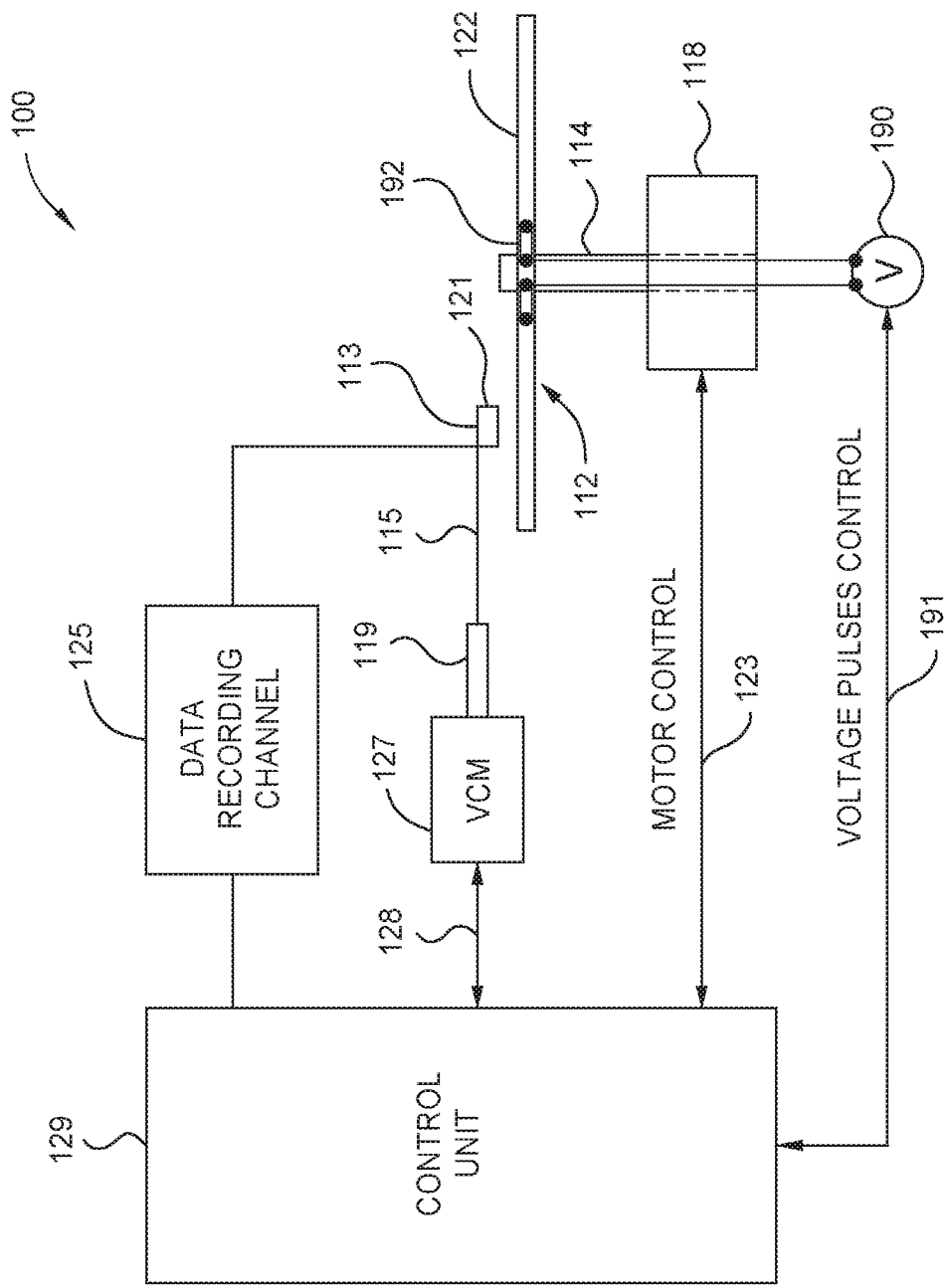
FIG. 1 is a schematic illustration of certain embodiments of a magnetic media drive including one or more rotatable magnetic disks.

FIG. 1 is a schematic illustration of certain embodiments of a magnetic media drive 100 including one or more rotatable magnetic disks 112 supported on a spindle 114 and rotated by a drive motor 118. For the ease of illustration, a single disk is shown according to one embodiment. A magnetic recording media on one or both surfaces of the magnetic disk 112 is formatted to any suitable patterns of data tracks, such as annular patterns of concentric data tracks on the magnetic disk 112. The magnetic disk 112 includes a voltage connector 192 configured to be coupled to a voltage source 190 to selectively provide a voltage across a ferroelectric layer of the magnetic disk 112. In certain embodiments, the voltage connector 192 is a slip ring to allow coupling of the voltage source 190 to the rotatable magnetic disk 112. In certain embodiments, the voltage source 190 is coupled to the voltage connector 192 through the spindle 114. In other embodiments, the voltage source 190 is coupled to the magnetic disk 112 through other voltage connections and/or other mechanisms.

One or more actuator arms 119 are positioned over and/or under the magnetic disk 112. For ease of illustration, a single arm is shown according to one embodiment. Each actuator arm 119 is coupled to a slider 113 supporting a head assembly 121. The head assembly 121 includes a write head and a read head. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The direction and speed of the movements of the VCM are controlled by motor current signals supplied by control unit 129.

During operation of the magnetic media drive 100, the rotation of the magnetic disk 112 generates an air or gas bearing between the slider 113 and the disk surface 122 which exerts a separation force on the slider 113. The air or gas bearing thus counter-balances the slight spring force of suspension 115 and supports slider 113 off and slightly apart from the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, controller storage, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. The control unit 129 generates control signals on line 191 to control a plurality of voltage pulses provided by the voltage source 190 to the magnetic disk 112.

Certain embodiments of the magnetic media drive 100 of FIG. 1 may further include a plurality of magnetic recording media on both surfaces of the magnetic disk 112, a plurality of magnetic disks 112, a plurality of actuator arms 119, or combinations thereof. For example, in certain embodiments, the magnetic disk 112 comprises a top surface and a bottom surface each with a magnetic recording media, in which a top head assembly 121 is disposed over the top surface and a bottom head assembly 121 is disposed over the bottom surface of the magnetic disk 112.

Figure 2:
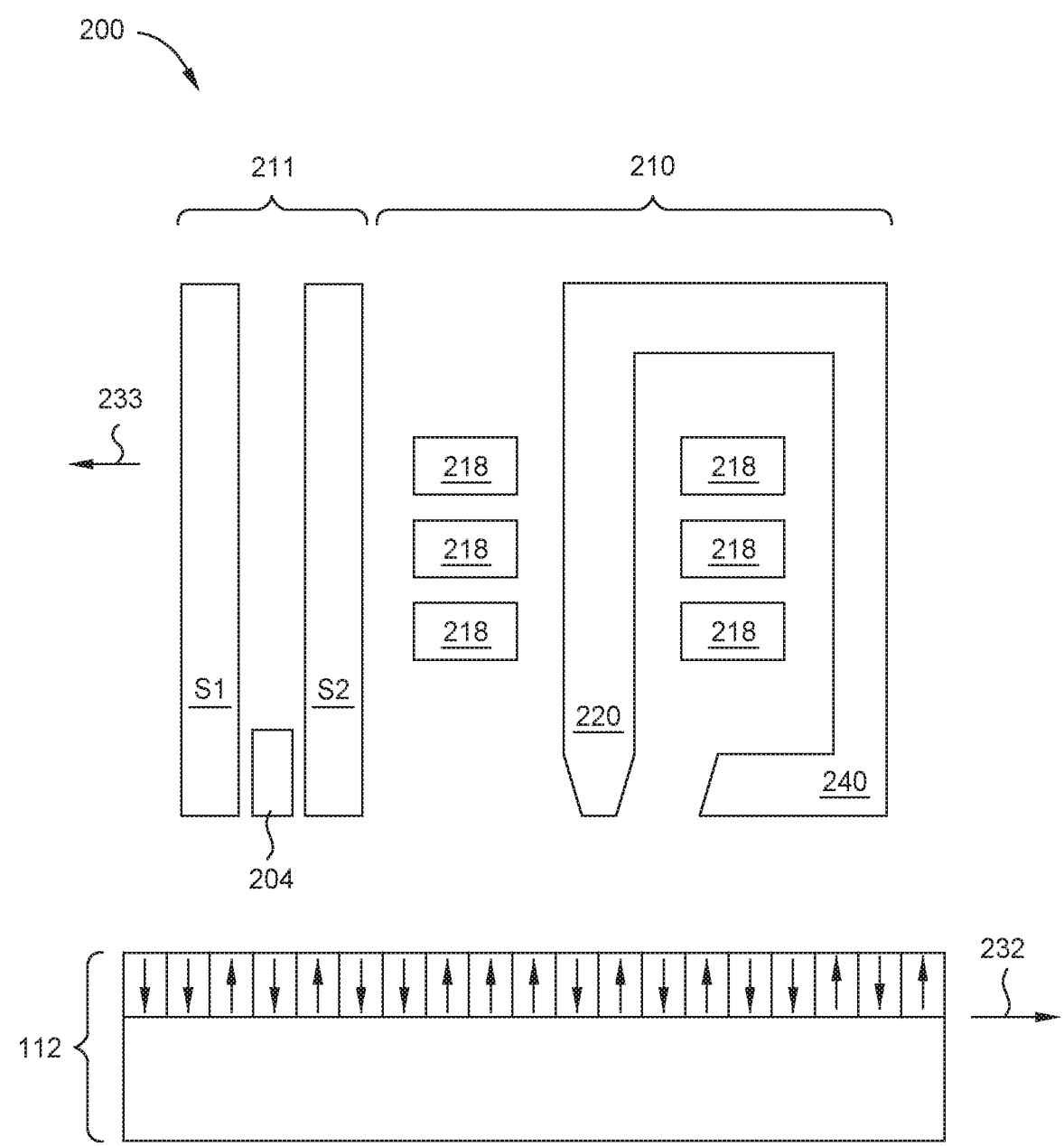
FIG. 2 is a schematic illustration of certain embodiments of a cross sectional side view of a head assembly facing a magnetic disk.

FIG. 2 is a schematic illustration of certain embodiments of a cross sectional side view of a head assembly 200 facing the magnetic disk 112 or other magnetic storage device. The head assembly 200 may correspond to the head assembly 121 described in FIG. 1 or other suitable head assemblies. The head assembly 200 includes a media facing surface (MFS) facing the magnetic disk 112. As shown in FIG. 2, the magnetic disk 112 moves relatively in the direction indicated by the arrow 232 and the head assembly 200 relatively moves in the direction indicated by the arrow 233.

The head assembly 200 includes a magnetic read head 211. The magnetic read head 211 include a sensing element 204 disposed between shields S1 and S2. The sensing element 204 and the shields S1 and S2 having a MFS facing the magnetic disk 112. The sensing element 204 is a magnetoresistive device sensing the magnetic fields of the recorded bits, such as perpendicular recorded bits or longitudinal recorded bits, in the magnetic disk 112 by a magnetoresistive effect.

The head assembly 200 includes a write head 210. The write head 210 includes a main pole 220 and a trailing shield (TS) 240. The main pole 220 comprises a magnetic material and serves as a main electrode. Each of the main pole 220 and the trailing shield (TS) 240 has a front portion at the MFS. The write head 210 includes a coil 218 around the main pole 220 that excites the main pole 220 producing a writing magnetic field for affecting a magnetic recording media of the rotatable magnetic disk 112. The coil 218 may be a helical structure or one or more sets of pancake structures. The TS 240 comprises a magnetic material and serves as a return pole for the main pole 220.

Figure 3:
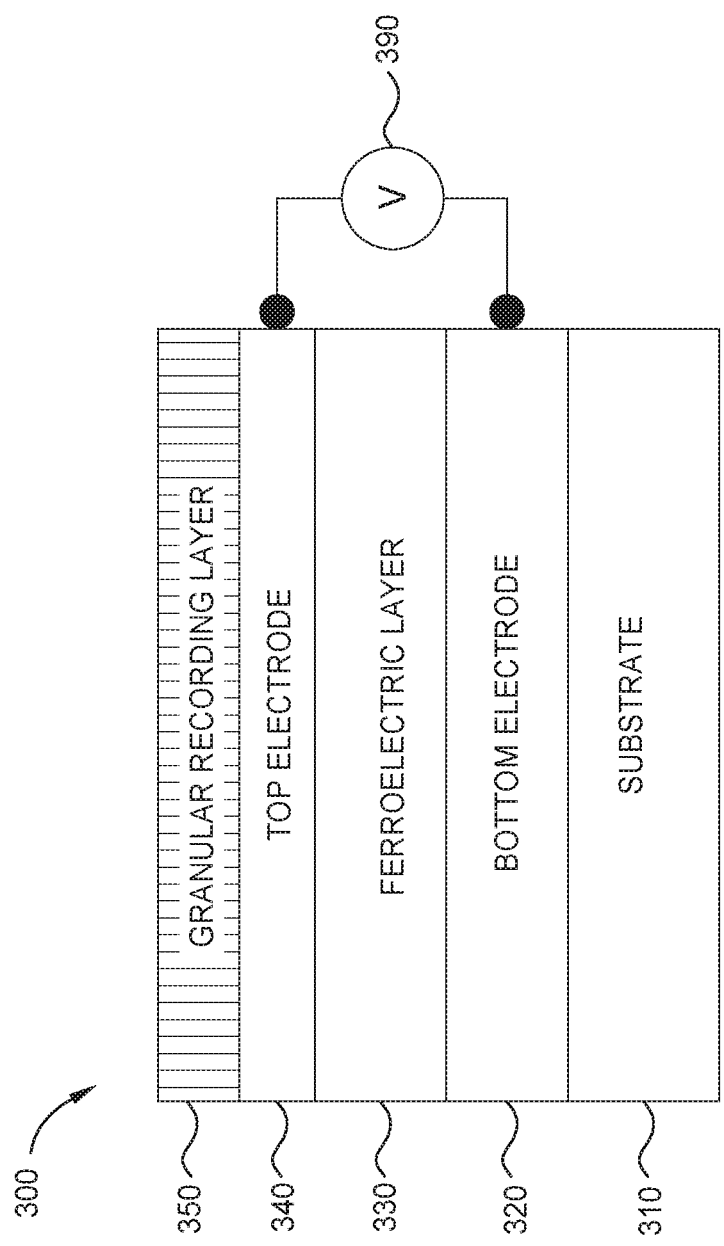
FIG. 3 is a schematic illustration of a magnetic recording media over a substrate forming a magnetic disk or another suitable data storage device.

FIG. 3 is a schematic illustration of a magnetic recording media 300 over a substrate forming a magnetic disk 112 of FIG. 2 or another suitable data storage device. The magnetic recording media 300 comprises a bottom electrode layer 320, a ferroelectric layer 330, a top electrode layer 340, and a recording layer 350.

The substrate 310 or platter comprises glass, silicon, metal, sapphire, or other suitable materials. If a metal substrate is used, a dielectric layer may be disposed over the metal substrate. The bottom electrode layer 320 is formed over the substrate 310. The bottom electrode layer 320 comprises Cr, Ru, Ta, Cu, Al, Ti, Pt, W, Ag, Au, Mo, Ni, other suitable electrically conductive materials, alloys thereof, or combinations thereof.

The ferroelectric layer 330 is formed over the bottom electrode layer 320. The ferroelectric layer 330 comprises [Pb(Mg$_{1/3}$Nb$_{2/3}$)O$_3$]—[PbTiO$_3$] (PMN-PT), Pb(Zr$_x$Ti$_{1-x}$)O$_3$ (PZT), BaTiO$_3$, PbTiO$_3$, SrTiO$_3$, LiTaO$_3$, CaMnO$_3$, PrCaMnO$_3$, BiFeO$_3$, other suitable ferroelectric oxide materials, or combinations thereof. In certain embodiments, the ferroelectric layer 330 is formed to a thickness from about 20 nm to about 100 nm.

The top electrode layer 340 is formed over or on the ferroelectric layer 330. The top electrode layer 340 comprises Cr, Ru, Ta, or other suitable electrically conductive materials that have a texture that promotes the formation of the recording layer 350.

The recording layer 350 is formed over or on the top electrode layer 340. The recording layer 350 comprises a ferromagnetic material. In certain embodiments, the recording layer 350 is formed to a thickness from about 3 nm to about 10 nm. In certain embodiments, the recording layer 350 comprises a granular ferromagnetic material. In certain embodiments, the recording layer 350 comprises a L1$_0$-ordered granular ferromagnetic material. The L1$_0$-ordered granular material comprises FePt, FePd, CoPt, CoPd, or other suitable L1$_0$ granular materials. A material can be formed into is L1$_0$-ordered phase by deposition and/or by anneal at a high temperature. For example, FePt deposited by physical vapor deposition at a temperature of about 400° C. or below has an A1 disordered structure. FePt deposited and/or annealed at a temperature of about 600° C. or above forms or transforms to the L1$_0$-ordered phase.

The granular material has high magneto-crystalline anisotropy with a magnetic axis oriented in a generally perpendicular direction to a surface of the substrate 310. The top electrode layer 340 comprising Cr, Ru, Ta or combinations thereof has a texture that promotes the granular formation of the granular material of the recording layer 350. The recording layer 350 may further comprise a segregant to support columnar grain growth of the granular material in the perpendicular direction. The segregant comprises Cr$_2$O$_3$, TiO$_2$, SiO$_2$, TaO$_5$, other metal oxides, carbon, other non-ferromagnetic materials, or combinations thereof.

The granular material of the recording layer 350 has a high magnetic anisotropy for higher bit surface density for the magnetic recording media 300. For example, a recording layer 350 comprising a CoCrPt granular film has a magnetic anisotropy ($K_u$) of approximately 0.3 MJ/m$^3$. For example, a recording layer 350 comprising a L1$_0$-ordered phase FePt granular film has a magnetic anisotropy ($K_u$) of approximately 6 MJ/m$^3$. Granular films due to their high magnetic anisotropy are used in PMR.

The bottom electrode layer 320 and the top electrode layer 340 span an area of the ferroelectric layer 330. The bottom electrode layer 320 and the top electrode layer 340 are coupled to a voltage source 390, such as through the voltage connector 192 of FIG. 1 or other suitable voltage connectors. A voltage from the voltage source 390 is applied to the magnetic recording media 300 via the top electrode layer 340 and the bottom electrode layer 320. A voltage from the voltage source 390 applied across the ferroelectric layer 330 deforms the lattice or the shape of the ferroelectric layer. The change in strain transferred from the ferroelectric layer 330 to the recording layer 350 changes the magnetic properties of the recording layer 350. A voltage is selectively applied to all or part of the ferroelectric layer 330 to modulate all or part of the recording layer 350 in a low coercivity state to assist in writing data to the ferromagnetic material and in a high coercivity state to assist in thermal stability of the stored data. Voltage-assisted magnetic recording (VAMR) is provided based upon control of a ferroelectric layer 330 between a bottom electrode layer 320 and a top electrode layer 340 with the recording layer 350 proximate the ferroelectric layer 330.

A voltage applied across the ferroelectric layer 330 deforms the lattice or the shape of the ferroelectric layer which transfers strain to the recording layer 350. In certain embodiments, the top electrode layer 340 is formed to a small thickness from about 1 nm to about 5 nm. The small thickness of the top electrode layer 340 helps to transfer the change in strain from the ferroelectric layer 330 to the recording layer 350. The bottom electrode layer 320 may be made to any suitable thickness.

In certain embodiments, an assisting voltage pulse from the voltage source 390 is applied across the ferroelectric layer 330 correlated to the writing operation of the write head 210. The voltage pulse produces a strain to the recording layer 350. For example, without being bound by theory unless specifically recited in the claims, the strain transferred to the recording layer 350 of L1$_0$ granular material reduces the coercivity of the recording layer by reducing the tetragonality of grains of the recording layer making the recording layer softer. The recording layer 350 with reduced coercivity assists in writing data to the recording layer by the write head 210.

Ferroelectric materials have an intrinsic property of spontaneous polarization. An external voltage in one polarity applied to the ferroelectric layer 330 aligns the ferroelectric domains in a first direction and an external voltage in the opposite polarity applied to the ferroelectric layer 330 aligns the ferroelectric domains in a second opposite direction (e.g., 180 degree switching). Voltage pulses are applied to the ferroelectric layer 330 to switch the direction of ferroelectric polarization in the ferroelectric layer 330. Depending on the direction of the ferroelectric polarization, the ferroelectric layer 330 increases or decreases the strain to the recording layer 350.

The assisting voltage pulse from the voltage source 390 polarizes the ferroelectric layer 330 in a first direction to increase strain to the recording layer 350 to assist in writing data to the recording layer. Even when the voltage pulse is turned off, the ferroelectric layer 330 will have a remaining polarization producing a remaining strain to the recording layer 350. A non-assisting voltage pulse in the opposite polarity of the assisting voltage pulse from the voltage source 390 switches the ferroelectric polarization of the ferroelectric layer 330 in a second opposite direction to decrease strain to the recording layer 350 so that the recording layer 350 has increased thermal stability. The assisting voltage pulse polarizes the ferroelectric layer 330 to assist in writing data to the recording layer 350 and the non-assisting voltage pulse switches the polarization of the ferroelectric layer 330 to increase the thermal stability of the recording layer 350.

In certain embodiments, the assisting voltage pulse can transition the ferroelectric layer 330 from a relaxed state to a stressed state to apply strain to the recording layer 350 to assist in writing data to the recording layer. In certain embodiments, the assisting voltage pulse can transition the ferroelectric layer 330 from a stressed state to a relaxed state to apply strain to the recording layer 350 to assist in writing data to the recording layer. In certain embodiments, the assisting voltage pulse can transition the ferroelectric layer 330 from a first stressed state in a first direction to a second stressed state in a second direction to apply strain to the recording layer 350 to assist in writing data to the recording layer.

In certain embodiments, a non-assisting voltage pulse from the voltage source 390 is applied across the ferroelectric layer 330 correlated to increased thermal stability of the recording layer 350, such as when data is not being written to the recording layer. The non-assisting voltage pulse removes a strain applied to the recording layer 350 and increases the coercivity of the recording layer 350 in comparison to the assisting voltage pulse. The recording layer 350 with increased coercivity assists in storage of data to the recording layer with reduced unintended bit flipping or with reduced superparamagnetism.

In certain embodiments, the non-assisting voltage pulse can transition the ferroelectric layer 330 from a stressed state to a relaxed state to remove strain applied to the recording layer 350 to assist in storage of data to the recording layer, e.g., after writing is completed. In certain embodiments, the non-assisting voltage pulse can transition the ferroelectric layer 330 from a relaxed state to a stressed state to remove strain applied to the recording layer 350 to assist in storage of data to the recording layer. In certain embodiments, the non-assisting voltage pulse can transition the ferroelectric layer 330 from a first stressed state in a first direction to a second stressed state in a second direction to remove strain applied to recording layer 350 to assist in storage of data to the recording layer.

Other attempts to utilize strain from a ferroelectric material in a magnetic recording media required locally providing an electric field directly across the ferroelectric material from one or two electrodes in the write head. However, such a write head would require either a good electrical physical contact by the write head to the magnetic recording media or a larger electric field generated by the magnetic recording media or both. Contact by the write head to the magnetic recording media will damage the magnetic recording media. A very large drive voltage to the electrode(s) in the write head is required to produce a large electric field to generate a sufficient potential/voltage difference across the ferroelectric material to generate a sufficient strain to generate a sufficient change in the magnetic properties of the recording layer. In addition, such a write head is limited to only providing an electric field to a small portion of the magnetic recording media. The locally produced electric field may inadvertently cause bit flipping errors of the recording layer since the electric field is directly applied across the recording layer as well.

In certain aspects, the present magnetic recording media 300 avoids having the write head contact the magnetic recording media 300. In certain aspects, the present magnetic recording media 300 can apply a voltage locally to a small area of the ferroelectric layer 330 (e.g., a small portion of the disk), sectionally to a larger area of the ferroelectric layer 330 (e.g., a large portion of the disk), or generally across the entire ferroelectric layer 330 (e.g., across the entire disk). In certain aspects, the present magnetic recording media 300 utilizes a smaller drive voltage since the drive voltage is directly applied across the ferroelectric material from the bottom electrode layer 320 and the top electrode layer 340 within the magnetic recording media 300. The electric field between the bottom electrode layer 320 and the top electrode layer 340 is not directly across the recording layer 350. Stray electric fields to the recording layer 350 are reduced due to the smaller drive voltage and/or due to the electrode layers disposed within the magnetic recording media versus the other attempts with electrode(s) within the write head.

In certain embodiments, voltage-assisted magnetic recording (VAMR) is employed without use of an energy-assisting magnetic recording write head. The magnetic recording media 300 can be modulated between a low coercivity state for writing of data and a high coercivity state by voltage pulses without the need for additional energy applied to the recording media from an EAMR write head. In other words, in certain embodiments, the magnetic recording media 300 can be used with a non-EAMR write head.

In certain embodiments, voltage-assisted magnetic recording (VAMR) is employed in combination with of an EAMR head. The magnetic recording media 300 can be modulated between a low coercivity state for writing of data and a high coercivity state by voltage pulses in combination with additional energy applied to the recording media from an EAMR write head. Heat-assisted magnetic recording (HAMR) and microwave assisted magnetic recording (MAMR) are examples of two types of EAMR write heads.

In MAMR, a spin torque oscillator (STO) device is located next to or near the write element in order to produce a high-frequency AC field, such as in a microwave frequency band. The high-frequency AC field reduces an effective coercivity of a magnetic recording media. One type of MAMR enabled magnetic recording is based on spin-transfer torque (STT). During operation, electrical current flows from the main pole to the trailing shield through a field generation layer (FGL). Transmitted polarized electrons from a spin polarization layer (SPL) and/or from reflected electrons are injected into the field generation layer causing switching or precession of the magnetization of the field generation layer by spin transfer torque from the injected electrons. Switching or precession of the magnetization of the field generation layer generates an assisting field to the write field. Another type of MAMR enabled magnetic recording is based on spin-orbital torque (SOT). During operation, charge current through a spin Hall layer generates a spin current in the spin Hall layer. The spin orbital coupling of the spin Hall layer and a spin torque layer (STL) causes switching or precession of magnetization of the STL by the spin orbital coupling of the spin current from the spin Hall layer. Switching or precession of the magnetization of the STL generates an assisting field to the write field.

In HAMR, a laser source is located next to or near the write element in order to produce heat, such as a laser source exciting a near-field transducer (NFT) to produce heat at a write location of a magnetic recording media. The heat at the write location reduces an effective coercivity of the magnetic recording media used to store data.

The magnetic recording media 300 may include additional layers. In certain embodiments, the magnetic recording media 300 further comprises a capping layer of a soft magnetic material to provide increased readability and/or writability. In certain embodiments, the magnetic recording media 300 further comprises an overcoat layer and/or a lubricant layer over the recording layer 350 to provide corrosion and mechanical protection (e.g., reduction of stiction). In certain embodiments, the magnetic recording media 300 further comprises a magnetic soft underlayer below the recording layer 350 to provide a magnetic flux return path for the write head. In certain embodiments, the magnetic recording media 300 further comprises a heat sink layer below the recording layer 350 to dissipate generated heat, such as heat generated from a HAMR write head.

Figure 4:
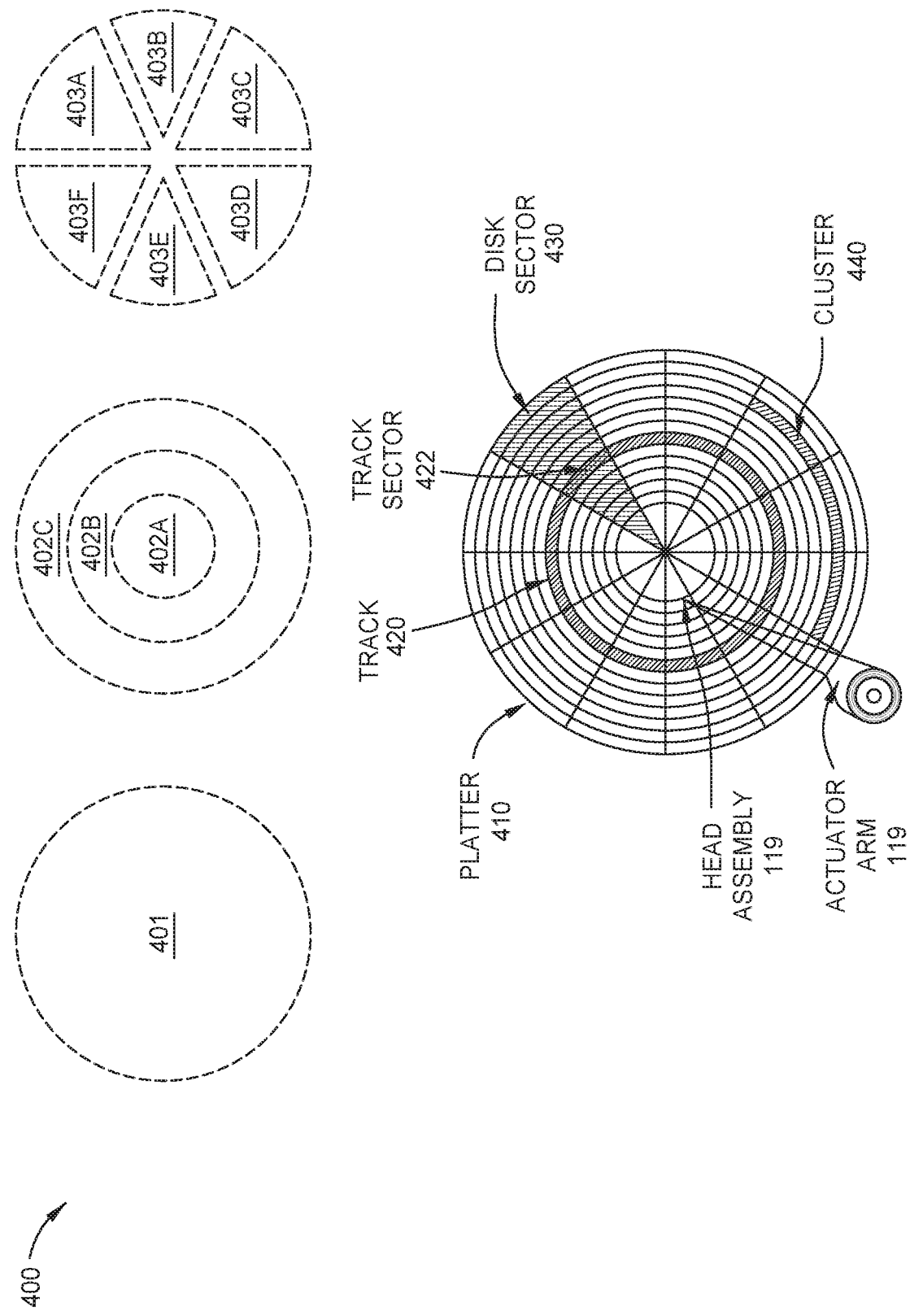
FIG. 4 is a schematic view illustrating a surface of a rotatable magnetic disk comprising the magnetic recording media of FIG. 3.

FIG. 4 is a schematic view illustrating a surface of a rotatable magnetic disk 400 comprising the magnetic recording media 300 of FIG. 3. The rotatable magnetic disk 400 comprises a substrate or platter 410. The magnetic recording media 300 is formed over the platter 410. The magnetic recording media can be formatted into a plurality of concentric tracks 420 with each concentric track formatted into a plurality of track sectors 422. The magnetic recording media can be formatted into a plurality of disk sectors 430.

In certain embodiments, the voltage source 390 is coupled to the bottom electrode layer(s) 320 and the top electrode layer(s) 340 so that an assisting voltage and a non-assisting voltage is applied across ferroelectric layer(s) in a single zone 401 substantially spanning the entire surface of the platter 410. In certain embodiments, the voltage source 390 is coupled to the bottom electrode layer(s) 320 and the top electrode layer(s) 340 so that an assisting voltage and a non-assisting voltage is selectively applied across ferroelectric layer(s) in multiple concentric zones 402 corresponding to one or more concentric tracks 420. In certain embodiments, the voltage source 390 is coupled to the bottom electrode layer(s) 320 and the top electrode layer(s) 340 so that an assisting voltage and a non-assisting voltage is selectively applied across ferroelectric layer(s) in multiple sector zones 403 corresponding to one or more disk sectors 430. In certain embodiments, at least one of the bottom electrode layer 320 and the top electrode layer 340 is formed into a single zone 401, concentric zones 402, or sector zones 403. In one example, the bottom electrode layer 320 is formed as a single zone 401, concentric zones 402, or sector zones 403 with the top electrode layer 340 formed as a single zone 401. In another example, the top electrode layer 340 is formed as a single zone 401, concentric zones 402, or sector zones 403 with the bottom electrode layer 320 formed as a single zone 401. In still another example, the bottom electrode layer 320 and the top electrode layer 340 are both formed into a single zone 401, concentric zones 402, or sector zones 403.

Figure 5:
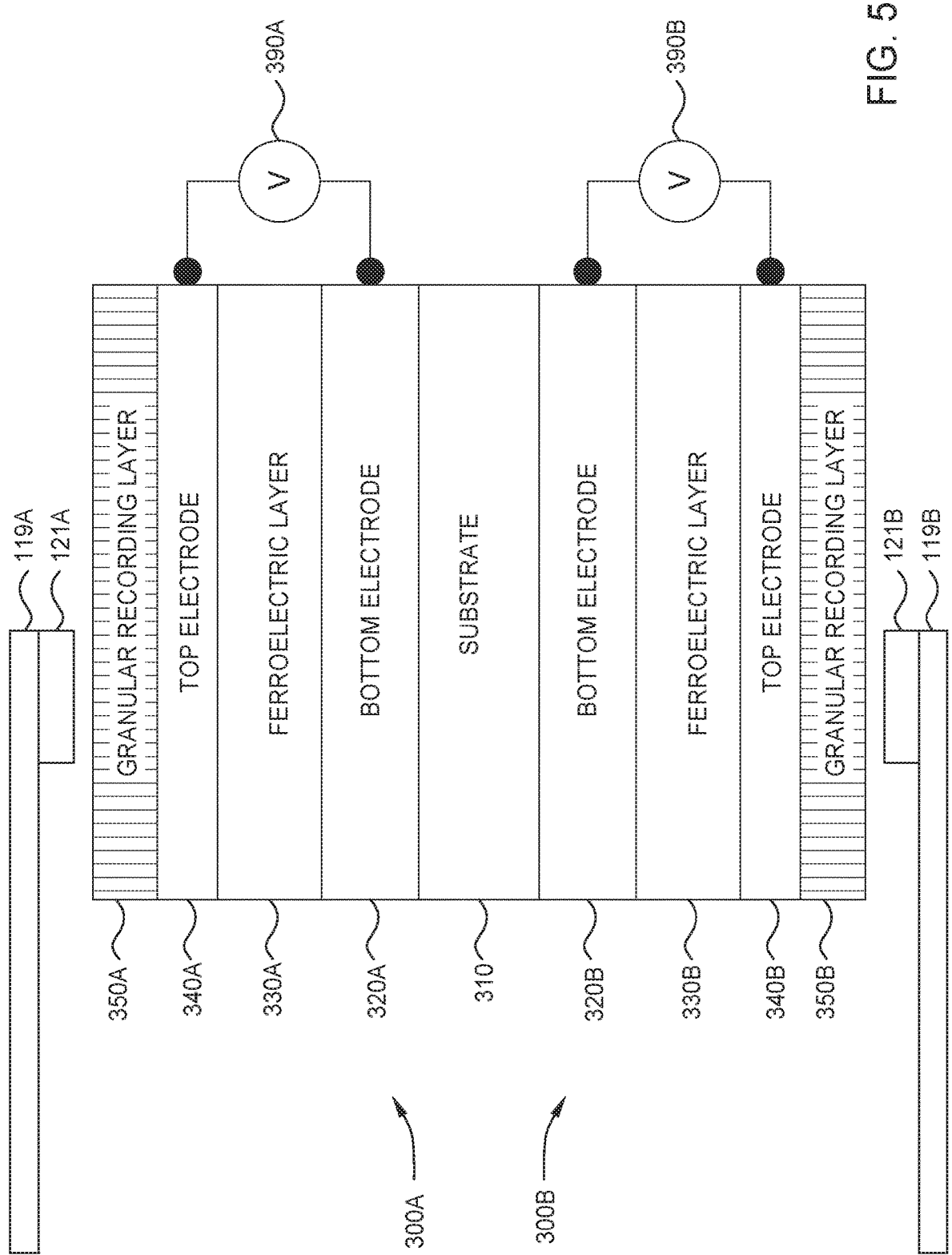
FIG. 5 is a schematic illustration of a magnetic recording media of FIG. 3 on a top surface and bottom surface of a substrate forming a magnetic disk or another suitable storage device.

FIG. 5 is a schematic illustration of the magnetic recording media 300 of FIG. 3 on a top surface and bottom surface of a substrate 310 or platter forming a magnetic disk or another suitable storage device. In certain embodiments, one or more voltage source 390 independently controls an assisting voltage and a non-assisting voltage to the magnetic recording media 300A on the top surface versus the magnetic recording media 300B on the bottom surface of the substrate 310. In certain embodiments, one or more voltage source 390 can control an assisting voltage and a non-assisting voltage to the magnetic recording media 300A-B together on the top surface and on the bottom surface of the substrate 310 in one or more zones.

Certain embodiments are directed to a data storage drive, such as a hard disk drive, including a magnetic recording media comprising a ferroelectric layer between a bottom electrode layer and a top electrode layer. An applied voltage to the ferroelectric layer deforms the lattice and/or the shape of the ferroelectric layer generating a strain that is transferred to a ferromagnetic recording layer formed proximate to the ferroelectric layer. The change in strain transferred to the recording layer changes the magnetic properties of the recording layer. A voltage can be selectively applied to all or part of the ferroelectric layer to place the ferromagnetic recording layer in a low coercivity state to assist in writing data and in a high coercivity state to assist in thermal stability of the stored data. Voltage-assisted magnetic recording (VAMR) is provided based upon control of a magnetic recording media comprising a ferroelectric layer between a bottom electrode layer and a top electrode layer.

In one embodiment, a magnetic media drive includes a write head, a magnetic disk, and a control unit. The magnetic disk includes a magnetic recording media. The magnetic recording media includes a bottom electrode layer, a top electrode layer, a ferroelectric layer between the bottom electrode layer and the top electrode layer, and a recording layer over the top electrode layer. The control unit is configured to cause a voltage to be applied to at least a part of the magnetic recording media via the top electrode layer and bottom electrode layer when the write head is writing to the magnetic recording media.

In one embodiment, a method of magnetic recording includes applying a voltage to a magnetic recording media and writing to the magnetic recording media with a recording head. The magnetic recording media includes a bottom electrode layer, a top electrode layer, and a ferroelectric layer between the bottom electrode layer and the top electrode layer, and a recording layer over the top electrode layer. The voltage is applied via the top electrode layer and the bottom electrode layer.

In one embodiment, a magnetic recording media is formed over a substrate or platter. The magnetic recording media includes a bottom electrode layer and a top electrode layer. A ferroelectric layer is between the bottom electrode layer and the top electrode layer. A recording layer is over or on the top electrode layer.

While the foregoing is directed to embodiments of the present disclosure, other and further embodiments of the disclosure may be devised without departing from the basic scope thereof, and the scope thereof is determined by the claims that follow.

What is claimed is:

1. A magnetic media drive, comprising:
   a write head;
   a magnetic disk, the magnetic disk comprising a magnetic recording media, the magnetic recording media comprising:
   a bottom electrode layer;
   a top electrode layer;
   a ferroelectric layer between the bottom electrode layer and the top electrode layer; and
   a recording layer over the top electrode layer; and
   a control unit configured to cause a voltage to be applied to at least a part of the magnetic recording media via the top electrode layer and bottom electrode layer when the write head is writing to the magnetic recording media.

2. The magnetic media drive of claim 1, wherein the magnetic disk further comprises a voltage connector to the bottom electrode layer and the top electrode layer.

3. The magnetic media drive of claim 2, wherein the recording layer is configured to be modulated between a high coercivity state and a low coercivity state by voltage pulses to the bottom electrode layer and the top electrode layer, the pulses from a voltage source coupled to the voltage connector.

4. The magnetic media drive of claim 2, further comprising a spindle upon which the magnetic disk is mounted, wherein the voltage connector is through the spindle.

5. The magnetic media drive of claim 1, wherein at least one of the bottom electrode layer and the top electrode layer is formed into zone selected from a group consisting of a single zone, concentric zones, and sector zones.

6. The magnetic media drive of claim 1, wherein the write head is a non-energy-assisted magnetic recording write head.

7. The magnetic media drive of claim 1, wherein the write head is a microwave assisted magnetic recording head.

8. The magnetic media drive of claim 1, wherein the write head is a heat assisted magnetic recording head.

9. The magnetic media drive of claim 1, wherein the magnetic recording media is on a top surface and on a bottom surface of the magnetic disk and wherein the write head comprises a first write head above the top surface and a second write head below the bottom surface of the magnetic disk.

10. A method of magnetic recording, comprising:
applying a voltage to a magnetic recording media comprising:
   a bottom electrode layer;
   a top electrode layer;
   a ferroelectric layer between the bottom electrode layer and the top electrode layer; and,
   a recording layer over the top electrode layer, wherein the voltage is applied via the top electrode layer and the bottom electrode layer; and
writing to the magnetic recording media with a recording head.

11. The method of claim 10, wherein applying the voltage comprises applying an assisting voltage pulse from a voltage source across the ferroelectric layer, wherein the assisting voltage pulse produces a strain on the recording layer.

12. The method of claim 11, further comprising:
after the writing, applying a non-assisting voltage pulse from the voltage source across the ferroelectric layer, wherein the non-assisting voltage pulse removes the strain on recording layer.

13. The method of claim 10, wherein applying the voltage to the magnetic recording media comprises applying voltage pulses to the bottom electrode layer and the top electrode layer to modulate the recording layer in a high coercivity state and in a low coercivity state.

14. The method of claim 10, wherein at least one of the bottom electrode layer and the top electrode layer is formed into a single zone.

15. The method of claim 10, wherein at least one of the bottom electrode layer and the top electrode layer is formed into a plurality of concentric zones.

16. The method of claim 10, wherein at least one of the bottom electrode layer and the top electrode layer is formed into a plurality of sector zones.

17. A magnetic recording media formed over a substrate, comprising:
   a bottom electrode layer;
   a top electrode layer;
   a ferroelectric layer between the bottom electrode layer and the top electrode layer; and
   a recording layer over the top electrode layer, wherein the recording layer is configured to be modulated in a low coercivity state by a voltage pulse in a first polarity to the bottom electrode layer and the top electrode layer, and in a high coercivity state by a voltage pulse in an opposite polarity to the bottom electrode layer and the top electrode layer.

18. The magnetic recording media of claim 17, wherein the recording layer comprises a granular ferromagnetic material.

19. The magnetic recording media of claim 18, wherein the top electrode layer comprises a material selected from a group of Cr, Ru, Ta, or combinations thereof.

20. The magnetic recording media of claim 18, wherein the granular ferromagnetic material has a magnetic axis oriented about perpendicular to the substrate.

21. The magnetic recording media of claim 18, wherein the recording layer comprises a $L1_0$-ordered granular ferromagnetic material.

22. The magnetic recording media of claim 17, wherein the top electrode layer is formed to a thickness from about 1 nm to about 5 nm.

23. The magnetic recording media of claim 17, wherein the voltage pulse in the first polarity increases a strain transferred from the ferroelectric layer to the recording layer and the voltage pulse in the opposite polarity decreases the strain transferred from the ferroelectric layer to the recording layer.

24. The magnetic recording media of claim 17, wherein the ferroelectric layer comprises a ferroelectric oxide material selected from a group consisting of $[Pb(Mg_{1/3}Nb_{2/3})O_3]$—$[PbTiO_3]$, $Pb(Zr_xTi_{1-x})O_3$ (PZT), $BaTiO_3$, $PbTiO_3$, $SrTiO_3$, $LiTaO_3$, $CaMnO_3$, $PrCaMnO_3$, $BiFeO_3$, and combinations thereof.

* * * * *